United States Patent
Wadsworth

[11] Patent Number: 5,938,212
[45] Date of Patent: Aug. 17, 1999

[54] HOLDER FOR NON-LOCKING BIT IN A LOCKING BIT CHUCK

[76] Inventor: Scott L. Wadsworth, 891 Dublin Gulch Rd., St. Ignatius, Mont. 59865

[21] Appl. No.: 09/225,640

[22] Filed: Jan. 5, 1999

[51] Int. Cl.$^6$ ................................................ B23B 31/20
[52] U.S. Cl. .............................. 279/42; 81/438; 279/143; 285/322; 403/313; 408/239 R
[58] Field of Search ....................... 279/30, 42, 143–145; 81/438, 439; 403/289, 290, 313, 314; 285/322; 408/239 R, 239 A, 238, 240

[56] References Cited

U.S. PATENT DOCUMENTS

| 146,143 | 1/1874 | Olmsted . | |
|---|---|---|---|
| 157,357 | 12/1874 | Stetson . | |
| 318,466 | 5/1885 | Graham . | |
| 323,181 | 7/1885 | Mason . | |
| 553,531 | 1/1896 | Long . | |
| 1,195,214 | 8/1916 | Hapgood . | |
| 2,370,487 | 2/1945 | Poutie | 279/42 |
| 2,421,174 | 5/1947 | Wyrick | 279/16 |
| 2,513,839 | 7/1950 | Robertson | 81/438 |
| 2,931,660 | 4/1960 | Barwinkel | 279/42 |
| 4,645,473 | 2/1987 | Mochizuki | 403/290 |
| 5,709,392 | 1/1998 | Barton | 279/62 |

FOREIGN PATENT DOCUMENTS

| 149777 | 7/1985 | European Pat. Off. | 81/439 |
|---|---|---|---|
| 19305 | 9/1905 | United Kingdom | 279/42 |

*Primary Examiner*—Steven C. Bishop
*Attorney, Agent, or Firm*—Keith S. Bergman

[57] ABSTRACT

An adaptive holder for interconnecting a non-locking bit shaft in a locking bit chuck provides an elongate body having a locking bit shaft at a first end and a chuck connector at the second end. The locking bit shaft is of hexagonal cross-section with an annular fastening groove defined spacedly inward of its outer end. The body is formed of elastically resilient material. The chuck connector provides a second body end defining a hexagonal fastening channel and a threaded external surface operatively carrying an annular collet threaded from its inner end outwardly to a point spacedly distant from its outer end with plural imperfectly formed threads in its outer end portion to cause radially inward motion of the body second end to move along the imperfect threads to releasably fasten a non-locking bit in the channel. The second end portion of the body may define one or more slots extending through the body to the fastening channel to aid radial motion of the body to fasten a bit.

6 Claims, 1 Drawing Sheet

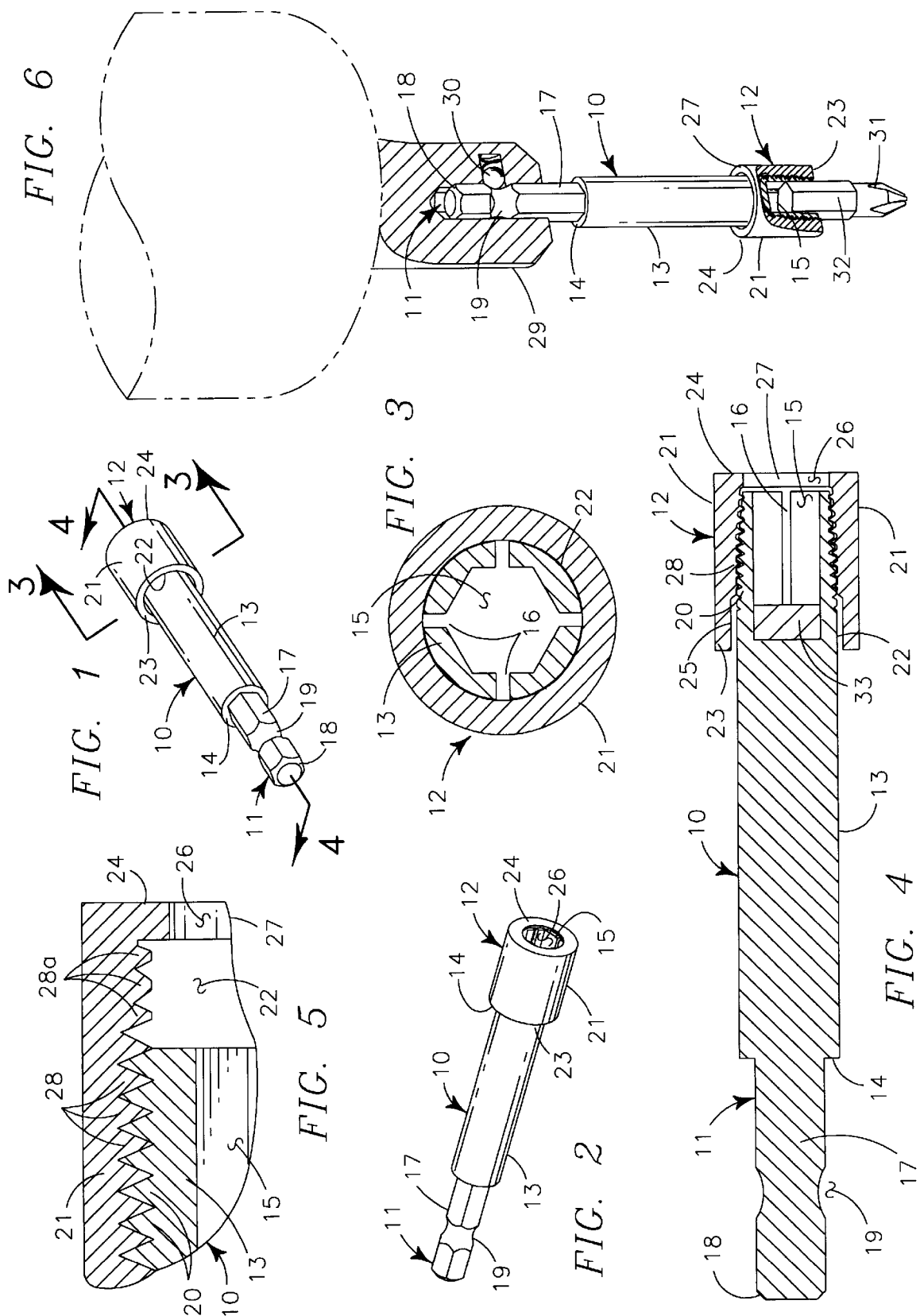

HOLDER FOR NON-LOCKING BIT IN A LOCKING BIT CHUCK

II. BACKGROUND OF INVENTION

IIA. RELATED APPLICATIONS

There are no applications related hereto heretofore filed in this or any foreign country.

IIB. FIELD OF INVENTION

This invent ion relates generally to chucks for holding polygonal shafts of tool bits, and more particularly to a holder having a hexagonal locking bit shaft at a first end and a two-piece chuck at the second end to fastenably maintain a hexagonal bit shaft not having a locking groove.

IIC. BACKGROUND AND DESCRIPTION OF PRIOR ART

A common interconnecting structure for simple releasable interconnection of a locking bit shaft in a locking bit tool chuck by only lineal motion in an axial direction provides a hexagonal shaft defining an annular fastening groove about its periphery spacedly inwardly from its connecting end portion. The tool chuck that accommodates this locking bit shaft defines a hexagonal channel to receive the locking bit shaft in slidable adjacency with a fastening member, commonly a spherical ball, biased to project inwardly into the channel to interfit in the fastening groove when the shaft is in appropriate axial position within the chuck. The fastening member carried by the chuck is spring-biased to an inward position, but movable against its bias, by axial motion of the locking bit shaft, to allow motion to fasten and release the bit shaft in the channel.

In the present day marketplace, tool bits of various manufacturers provide hexagonal fastening shafts that either do not define a fastening groove or may define a fastening groove, but one of a configuration or in a position such that it is not available for fastening use in a particular chuck because the inwardly projecting fastening element of the chuck can not engage in the groove. The instant invention provides an elongate adaptive holder having a first end that defines a traditional hexagonal shaft with annular fastening groove to fit in the traditional chuck of a powering tool to be serviced and a second end defining a simple two-piece chuck structure having a body defining a hexagonal channel to accept a hexagonal bit shaft with a collet threadedly engaged about the chuck body that, responsive to rotary motion, releasably fastens or releases the bit shaft by reason of elastic deformation of the chuck body.

Many and various chucks that engage, irrotatably hold and release bit shanks of various cross-sectional configurations responsive to motion of some type of a collet have heretofore become known and are widely used in modern tools. Most such known devices, that operate responsive to rotary motion of the collet, generally have been of a complex nature with numerous separate mechanically biased elements that are moved relative to each other to provide opening and closing motion of a bit shaft channel. Commonly such chucks have had a bit shaft channel defined by at least three relatively movable bit shaft contacting elements to provide means for centering or axial alignment of the bit shaft and many such devices have been more commonly used with round shafts than with shafts having a polygonal cross-sectional configuration. The complexity of such devices has tended to increase their cost and to decrease their ease of operation and their reliability.

The instant chuck in contradistinction provides only two unitary, relatively movable elements, a chuck body and collet, that are easily and simply formed to decrease cost and provide more simple and reliable use. This structural difference is allowed by reason of the generally uniform size and hexagonal configuration of bit shafts being held, as these shafts require no adjustable sizing or centering structure and prevent relative rotary motion of the shaft in the chuck channel by absolute mechanical engagement rather than frictional engagement of plural mechanical elements on a cylindrical surface. The chuck body also uses the elastic resilience of the material from which it is formed to cause fastening and release of a bit shank as distinguished from separate and independent biasing structures and uses direct radial motion of the collet for fastening and release functions as opposed to lineal motion of plural chuck jaws on a surface angulated to the chuck axis as in Jacobs chuck-type tools. The tool also provides a more efficient and longer life in that any wear between adjacent relatively movable threaded surfaces of the chuck body and collet merely tends to extend the threaded portion of the inner surface of the collet to further continue the pre-existing operation of the device as opposed to destroying or lessening that operation or its efficiency.

My invention lies not in any one of these features individually, but rather in the synergistic combination of all of the structures of my holder that necessarily give rise to the functions flowing therefrom as herein specified and claimed.

III. SUMMARY OF INVENTION

The instant invention generally provides an elongate tool body having a first end portion defining a fastening shaft of hexagonal cross-section with an annular locking groove defined about the periphery to operatively fit into a locking bit chuck responsive to axial motion and a second end portion, defining a hexagonal channel to slidably receive a hexagonal tool bit shaft, with threads defined about the peripheral surface inwardly from the second end to engage a collet carried thereabout. The collet provides an annulus threaded on its inner cylindrical surface from the inner end outwardly to a point spacedly distant from the outer end by a progressive threading die that defines progressively less perfect, partially cut threads in the outer threaded portion of the collet. With such imperfect threads, as the second end portion of the body is moved into the collet and the imperfect threads, the body to move axially necessarily must move radially inwardly against its elastic resilience that maintains relaxed configurational stability to releasably fasten a bit shaft in the chuck channel. The second end portion of the body defining the fastening channel may have one or more slots defined therethrough to provide relief to aid elastic motion of the body material radially inwardly about the channel. A magnet may be carried in the inner end portion of the channel to aid bit placement and maintenance, especially during fastening.

In creating such a device, it is:

A principal object to provide a holder having a first end portion defining a hexagonal shaft with an annular fastening groove to operably fit within a locking bit chuck that releasably maintains a bit shaft responsive to axial motion of the shaft and a second end portion that defines a chuck to releasably fasten a hexagonal bit shaft that does not define an operable annular fastening groove.

A further object is to provide such a holder that has a chuck formed by two relatively movable parts with a collet threadedly engaged on the peripheral surface of the chuck body to change radial size of the chuck channel responsive to elasticity of the chuck body and rotary motion of the collet.

A further object is to provide such a holder that has an internally threaded channel extending partially therethrough with progressively less perfectly formed threads in its outer end portion so that, as the threaded end portion of the chuck carrying the collet moves into the imperfectly threaded area, the material of the chuck is moved radially inwardly against its elastic bias to releasably fasten a tool shank in the channel defined in the chuck.

A still further object is to provide such a holder wherein wear between the adjacent, relatively movable threaded portions of the chuck and collet merely tends to extend the threaded portion of the collet to further continue rather than inhibit the action of the holder.

A still further object is to provide such a holder that is of new and novel design, of rugged and durable nature, of simple and economic manufacture and one that is otherwise well suited to the uses and purposes for which it is intended.

Other and further objects of my invention will appear from the following specification and accompanying drawings which form a part hereof. In carrying out the objects of my invention, however, it is to be understood that its features are susceptible of change in design and structural arrangement with only one preferred and practical embodiment of the best known mode being illustrated in the accompanying drawings and specified as is required.

IV. BRIEF DESCRIPTION OF DRAWINGS

In the accompanying drawings which form a part hereof and wherein like numbers of reference refer to similar parts throughout:

FIG. 1 is an isometric view of the holder looking obliquely from the inner tool fastening end to the outer bit fastening end.

FIG. 2 is an isometric view of the holder of FIG. 1 looking obliquely from the outer bit fastening end to the inner tool fastening end.

FIG. 3 is an enlarged transverse cross-sectional view through the collet portion of the holder of FIG. 1, taken on the line 3—3 thereon in the direction indicated by the arrows.

FIG. 4 is an elongate medial cross-sectional view through the holder of FIG. 1, taken on the line 4—4 thereon in the direction indicated by the arrows.

FIG. 5 is an enlarged section of the outer end portion of the holder of FIG. 4 to better show the nature of the interfitting threaded chuck elements.

FIG. 6 is a partially cut-away view showing the use of my holder interconnecting a powering tool with a tool bit.

V. DESCRIPTION OF THE PREFERRED EMBODIMENT

My invention generally provides a holder having body 10 with locking bit shaft 11 defined in a first end portion and chuck connector 12 defined in the second end portion.

Body 10 defined by elongate cylinder 13 preferably of a circular cross-sectional configuration somewhat larger than that of the shank of locking bit connector 11, to define shoulder 14 therebetween to limit the axial extension of the locking bit connector into a receiving chuck to a fastenably interconnectable position. The body defines tool bit shaft channel 15 extending in axial alignment spacedly inwardly from its second end. This channel is of hexagonal cross-sectional configuration, generally, though not necessarily, of the same size and configuration as the locking bit shaft 11 so that the channel will accept the shaft of a non-locking tool bit that is of the same size and configuration as the locking bit shaft. The axial length of channel 15 is not critical, but it is long enough to securely support the connecting shaft of a bit to be held therein and the cross-sectional configuration and dimension should be such as to fit in close adjacency with that bit shaft to aid and make the interconnection more secure. The channel may optionally carry magnet 33 in its inner end portion to aid in maintaining a magnetically permeable bit shaft therein, especially during placement and fastening.

The second end portion of the holder body in the instance illustrated defines one or more elongate slots 16 to aid elastic deformation of that portion of the body into the channel 15 when fastening a bit shaft therein. In the instance illustrated the slots 16 are four in number, quadrantally arrayed and extend from the second end of the body inwardly to the inward extension of channel 15, but this configuration is not essential and in fact, depending upon the elasticity of the material involved, no such slots may be required.

Locking bit connector 11 may be either unitarily defined in the first end portion of body 10 or separately formed and structurally interconnected with the body, in either instance in axial alignment with the body. The locking bit connector provides elongate connector shaft 17 of hexagonal cross-sectional configuration and preferably such size as a circumscribing cylinder will be somewhat less in diameter than the diameter of the body 10 to provide for the existence of shoulder 14. The outer end portion of shaft 17 defines chamfer 18 to aid insertion in the channel of a chuck that is to hold the locking bit connector. Annular fastening groove 19 is defined in the periphery of shaft 17, spacedly inwardly from the outer end of the shaft and in an axial position to fastenably interconnect within the channel of the chuck of a tool that accepts such type of locking bit. The cross-sectional shape of the fastening groove 19 normally is somewhat elliptical in nature with greater curvature in its radially innermost portion and lesser curvature in its radially outer portions to provide a less steep ramp over which to move a fastening element, which normally is of spherical configuration, when moving the locking bit shaft axially in the channel to allow more easy motion for fastening and release.

Chuck connector 12 provides external threads 20 defined in the cylindrical periphery of the second end portion of body 10. Threads 20 in the instance illustrated are standard machine threads extending from the outer second end of body 10 spacedly inwardly, preferably to a distance substantially equal to the inner extension of channel 15. Neither the type nor pitch of these threads is critical to my holder, but these parameters do affect the operation of the chuck. For ordinary holders having approximately one-fourth (0.25) inch connecting shafts, such as for many screw and nut driver bits, a ten to twenty pitch thread of normally ASME configuration has been found satisfactory.

Collet 21 provides cylindrical annular body defining medial collet channel 22 extending from the axially inner end 23 outwardly to a point spacedly distant from outer end 24. The root diameter of the threaded portion of channel 22 is incrementally larger than the root diameter of the threaded second end portion of body 10 to allow relative rotary motion, and preferably, as in the illustration of FIG. 4, a larger bore 25 is defined in the inward end portion of the channel. The outer end 24 of the collet defines medial channel 26 to allow access of a bit shaft to collet channel 22, but yet small enough to define optional radially inwardly extending annular rim 27 in the outer end portion of the collet channel.

Medial channel 22 defines threads 28 created with a progressive internal thread cutting die that requires at least two or three revolutions to completely define the first thread cut by it in the collet channel. This die cutting tool is applied from the inner end 23 of the collet to create a series of imperfectly cut threads 28a axially inward from rim 27 as shown in the enlarged illustration of FIG. 6. With this arrangement and configuration of threads in the collet, as the second body end is threadedly engaged in the collet threads 28 will not progress beyond the last perfectly defined thread of the collar without moving the body about channel 15 radially inwardly, since the body threads are perfectly formed and of a greater crest length than the groove depth of the imperfectly formed threads 28b of the collet.

The material from which body 10 is formed must be of such nature as to provide elastic resilience for my holder to be operative, since that material must allow deformation and yet return to its original shape when a deforming force is removed. The material of preference for the body is an aluminum alloy that has appropriate elastic parameters and yet is sufficiently hard to provide a useful life of reasonable length without allowing undue wear, though other materials having the required physical characteristics may also be used and are within the ambit and scope of my invention. The material from which collet 21 is formed is not so critical, but preferably is of a somewhat harder, less elastic nature than the body material to lessen collet wear and prevent galling or similar surface reactions that would inhibit motion of the threaded portions of the collet relative to the body. The material of reference for the collet is brass, but other materials having similar characteristics are within the ambit and scope of my invention, though they may not lessen galling and possess the lubrication-like frictional characteristics of brass.

Having described the structure of my holder its function may be understood.

A holder is constructed according to the foregoing specification and installed in locking bit chuck 29 by inserting elongate connecting shaft 17 within the channel of that chuck and moving it axially inwardly until fastening groove 19 engages fastening ball 30 of the chuck for releasable positional maintenance of the shaft, as in the case of an ordinary tool bit designed for use in such a channel. If necessary, collet 21 is rotated to relieve any radially inwardly directed force on the second end portion of the body 10 to allow that end portion to assume its normal configuration by reason of the elasticity of the material forming it. Tool bit 31 having hexagonal fastening shank 32, without a fastening groove, is placed with its fastening shank in channel 15 of the body.

The collet 21 is then rotated to move inwardly on threads 20 defined in the periphery of the second end portion of the body until the threaded end portion of the body communicates with the axially innermost of the imperfectly formed threads 28a in the outer portion of the collet. The rotary motion of the collet is continued until fastening shank 32 is appropriately fastened within channel 15 defined in the body. The fastening of shank 32 of a tool bit is accomplished by elastic deformation of the threaded outer end portion of body 10 since, as a perfectly formed thread 28 of the body enters the groove of an imperfectly formed thread 28b of the collet 21, the threaded body portion will have to move radially inwardly for further rotary motion of the collet to occur. This elastically deforms the body, as can be seen especially in the enlarged illustration of FIG. 6, to beget the shank fastening. The one or more slots 16 defined in the second end portion of the body 10 aid this elastic deformation in allowing more free radial motion of the body end portion by allowing extensive forces to operate thereon rather than requiring compressive forces which would have to be substantially greater to accomplish adequate deformation for fastening.

The tool bit 31 may be released from the holder by reversing the fastening operation and rotating the collet to move axially outwardly on the body second end portion to allow that body portion to return to its normal relaxed configuration and thusly releasing the fastening shank of the tool bit from fastening engagement within the body channel 15.

It is to be particularly noted in considering the operation of the collet 21 upon body 10 that, since the collet is formed of harder material than the body, any wear caused by holder operation will tend merely to form more perfect threads 28 in the collet from the imperfect threads 28a there present, at least until the end portion of the body is stopped in its axially motion by contact with rim 27 and for even longer life the rim 27 may not be provided at all, if desired. This wear enhancing feature provides a longer useful life for the holder than would exist were it not for the feature.

The foregoing description of my holder is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by letters patent, and

What I claim is:

1. A holder for interconnecting a polygonal non-locking bit shaft in a locking bit chuck, comprising in combination:
   an elongate body formed of resiliently deformably material having first and second ends with a locking bit shaft at the first end and a chuck connector at the second end;
   said locking bit shaft axially aligned with the body, having a polygonal cross-section and defining an annular fastening groove to fastenably interfit in a locking bit chuck; and
   said chuck connector having
      a fastening channel of hexagonal cross-section axially aligned with the locking bit shaft and extending spacedly inwardly from the second end of the body,
      a threaded peripheral portion defined in the body extending spacedly inwardly from the second end, and
      an annular collet having inner and outer ends and internal threads to engage the threads defined in the body, said collet threads being defined from the inner end outwardly to a point spacedly distant from the outer end, the outer end portion of said threads being only partially defined with progressively perfect valleys in an outward direction.

2. The holder of claim 1 wherein the second end portion of the body defines at least one slot extending axially from the second body end spacedly inwardly and radially to communicate through the body to the fastening channel.

3. In a holder for fastening a non-locking bit shaft in a locking bit chuck with a body having first and second ends, at least the second end portion of the body formed of resiliently deformable material and a locking bit fastening shaft axially aligned with the body defined in the first end, the invention comprising:

a chuck connector at the second end of the body, said chuck connector having an axially aligned fastening channel extending inwardly a spaced distance from said fastening channel having a hexagonal cross-sectional configuration to accept a hexagonal non-locking fastening shaft of a non-locking bit, and threads defined in the periphery of the body to extend spacedly inwardly from the second body end; and an annular collet having inner and outer ends with internal threads defined from the inner end to a point spacedly distant from the outer end to threadedly engage the threads defined in the second end portion of the body, with at least one of the outermost collet threads being only partially defined with an imperfect valley to cause radially inward motion of the second end portion of the body to pass into the at least one imperfect thread to fasten a connecting shaft in the chuck channel.

4. The holder of claim 3 having a body formed of an aluminum alloy.

5. The holder of claim 3 having at least one slot defined from the second end portion of the body axially inwardly to extend through the body to the fastening channel to aid resilient fastening motion of the second end portion of the body.

6. A holder for the fastening shaft of a non-locking bit in a locking bit chuck, comprising in combination:

an elongate body having first and second ends;

a locking bit fastening shaft at the first body end axially aligned with the body, said fastening shaft having a hexagonal cross-sectional configuration and defining an annular fastening groove spacedly distant from the body to fastenably fit in a locking bit chuck;

a fastening channel defined in the body to extend from the second end spacedly inwardly in axial alignment with the body to receive a hexagonal fastening shaft of a non-locking bit;

at least one slot defined in the second end portion of the body to extend in axial alignment through the body periphery to the fastening channel;

threads defined in the second end portion of the body to extend inwardly a spaced distance from the second end; and an annular collet having inner and outer ends carried on the second end portion of the body, said collet having internal threads defined from the inner end outwardly to a point spacedly inward from the outer end to engage the threads defined in the outer end portion of the body, and at least the outermost thread defined in the collet being partially formed with an imperfect valley to cause the second outer end portion of the body to move radially inwardly to pass into the at least one imperfect thread of the collet.

\* \* \* \* \*